(12) United States Patent
Behrens et al.

(10) Patent No.: US 7,275,720 B2
(45) Date of Patent: Oct. 2, 2007

(54) ACTIVELY COOLED CERAMIC THERMAL PROTECTION SYSTEM

(75) Inventors: William W. Behrens, St. Louis, MO (US); Andrew R. Tucker, Glendale, MO (US); Gayl J. Miller, Edwardsville, IL (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/457,594

(22) Filed: Jun. 9, 2003

(65) Prior Publication Data
US 2004/0245373 A1 Dec. 9, 2004

(51) Int. Cl.
*B64C 1/10* (2006.01)

(52) U.S. Cl. .................. 244/171.8; 244/121; 244/126; 244/171.7

(58) Field of Classification Search ............ 244/117 R, 244/158 A, 118.1, 118.2, 119, 121, 126, 123, 244/128, 132, 133, 117 A, 158.1, 171.7, 171.8
See application file for complete search history.

(56) References Cited

U.S. PATENT DOCUMENTS

| | | | | |
|---|---|---|---|---|
| 2,843,341 A | * | 7/1958 | Dannenberg et al. | 244/200 |
| 2,908,455 A | * | 10/1959 | Hoadley | 244/117 A |
| 2,941,759 A | | 6/1960 | Rice et al. | |
| 3,011,760 A | * | 12/1961 | Eckert | 416/90 R |
| 3,056,432 A | * | 10/1962 | Glaze | 139/425 R |
| 3,122,883 A | * | 3/1964 | Terner | 428/34.6 |
| 3,128,544 A | * | 4/1964 | Allingham | 419/9 |
| 3,138,009 A | * | 6/1964 | McCreight | 62/315 |
| 3,261,576 A | | 7/1966 | Valyi | |
| 3,267,857 A | * | 8/1966 | Lindberg, Jr. | 244/159.1 |
| 3,452,553 A | | 7/1969 | Dershin et al. | |
| 3,614,038 A | * | 10/1971 | Nichols | 244/134 C |
| 3,720,075 A | * | 3/1973 | Gray | 62/467 |
| 3,793,861 A | * | 2/1974 | Burkhard et al. | 62/315 |
| 3,808,833 A | * | 5/1974 | Allen et al. | 62/467 |

(Continued)

OTHER PUBLICATIONS

Rescor Ceramic Board, Contronics Corporation, www.cotronics.com.*

(Continued)

*Primary Examiner*—Stephen A. Holzen
(74) *Attorney, Agent, or Firm*—Timothy K. Klintworth; Wildman, Harrold, Allen & Dixon, LLP

(57) ABSTRACT

An apparatus and method for thermal protection is provided. A thermal protection apparatus includes a porous layer attached to an inner structural member requiring thermal protection. The porous layer serves as both a cooling air plenum and a transpiring medium. The porous layer may include a low strength ceramic foam layer. Thermal protection may be achieved by flowing cooling air the length of the porous layer. The voids in the porous layer may be sized to less than 50 μm, producing uniquely efficient thermal protection due to micro-fluidic effects in the air flowing through the layer. A semi-permeable layer may be attached to the outer surface of the porous layer. The semi-permeable layer may prevent erosion of the porous layer and may transform the porous layer into a plenum by making the majority of the cooling air flow the length of the porous layer before exiting through small holes drilled or punched through the semi-permeable layer.

12 Claims, 2 Drawing Sheets

U.S. PATENT DOCUMENTS

| | | | | |
|---|---|---|---|---|
| 4,151,800 A | * | 5/1979 | Dotts et al. | 244/159.1 |
| 4,434,201 A | * | 2/1984 | Humphreys | 428/137 |
| 4,482,111 A | * | 11/1984 | Le Touche | 244/117 A |
| 4,592,950 A | * | 6/1986 | Le Touche | 442/283 |
| 4,629,397 A | * | 12/1986 | Schweitzer | 244/117 A |
| 4,671,348 A | * | 6/1987 | Bauer | 165/41 |
| 4,739,952 A | * | 4/1988 | Giles | 244/117 A |
| 4,849,276 A | | 7/1989 | Bendig et al. | |
| 4,949,920 A | * | 8/1990 | Schindel et al. | 244/117 A |
| 4,990,391 A | | 2/1991 | Veta et al. | |
| 4,991,797 A | * | 2/1991 | Miller et al. | 244/117 R |
| 5,000,998 A | | 3/1991 | Bendig et al. | |
| 5,041,321 A | | 8/1991 | Bendig | |
| 5,043,182 A | * | 8/1991 | Schultze et al. | 427/454 |
| 5,154,373 A | * | 10/1992 | Scott | 244/117 R |
| 5,236,151 A | * | 8/1993 | Hagle et al. | 244/117 A |
| 5,257,757 A | * | 11/1993 | Paul et al. | 244/117 A |
| 5,310,592 A | | 5/1994 | Baker et al. | |
| 5,312,693 A | * | 5/1994 | Paul | 428/554 |
| 5,322,725 A | * | 6/1994 | Ackerman et al. | 428/137 |
| 5,330,124 A | * | 7/1994 | Le Touche | 244/117 A |
| 5,374,476 A | * | 12/1994 | Horsley | 428/305.5 |
| 5,472,760 A | * | 12/1995 | Norvell | 428/71 |
| 5,560,974 A | * | 10/1996 | Langley | 428/198 |
| 5,618,363 A | | 4/1997 | Mullender et al. | |
| 5,624,613 A | | 4/1997 | Rorabaugh et al. | |
| 5,632,151 A | | 5/1997 | Baker et al. | |
| 5,958,583 A | | 9/1999 | Rorabaugh et al. | |
| 5,980,980 A | | 11/1999 | DiChiara, Jr. et al. | |
| 6,007,026 A | | 12/1999 | Shorey | |
| 6,074,699 A | | 6/2000 | DiChiara, Jr. et al. | |
| 6,086,664 A | | 7/2000 | Blohowiak et al. | |
| 6,161,776 A | * | 12/2000 | Byles | 239/145 |
| 6,210,773 B1 | | 4/2001 | Moore | |
| 6,273,365 B1 | | 8/2001 | Hiesener et al. | |
| 6,284,691 B1 | * | 9/2001 | Bruce | 501/103 |
| 6,371,977 B1 | * | 4/2002 | Bumbarger et al. | 607/108 |
| 6,419,189 B1 | | 7/2002 | DiChiara, Jr. et al. | |
| 6,521,555 B1 | * | 2/2003 | Bodaghi et al. | 442/400 |
| 6,712,318 B2 | * | 3/2004 | Gubert et al. | 244/171.7 |
| 2002/0061396 A1 | * | 5/2002 | White | 428/293.4 |
| 2002/0110698 A1 | * | 8/2002 | Singh | 428/472 |
| 2002/0149128 A1 | | 10/2002 | DiChiara, Jr. | |
| 2002/0170739 A1 | * | 11/2002 | Ryeczek | 174/112 |
| 2002/0195525 A1 | | 12/2002 | Anton et al. | |
| 2003/0032545 A1 | | 2/2003 | DiChiara, Jr | |
| 2003/0082414 A1 | | 5/2003 | DiChiara, Jr. et al. | |
| 2003/0207155 A1 | * | 11/2003 | Morrison et al. | 428/699 |
| 2003/0208831 A1 | * | 11/2003 | Lazar et al. | 2/69 |
| 2004/0245373 A1 | * | 12/2004 | Behrens et al. | 244/10 |
| 2004/0245389 A1 | * | 12/2004 | Behrens et al. | 244/117 A |
| 2005/0077431 A1 | * | 4/2005 | Preston | 244/145 |
| 2005/0108118 A1 | * | 5/2005 | Malackowski et al. | 705/30 |
| 2006/0060702 A1 | * | 3/2006 | Behrens et al. | 244/117 A |
| 2006/0100948 A1 | * | 5/2006 | Millien et al. | 705/35 |

OTHER PUBLICATIONS www.answers.com, "ceramic", pp. 1-7.*
Grader, Gideon, "A New Approach to Ceramic Foams", p. 1 of 1.*
"The Sol-Gel Gateway", www.solgel.com, "the wor'ds Lightes Ceramic Foam Material".*
Patent Application Specification for U.S. Appl. No. 10/457,594, filed Jun. 9, 2003.
Patent Application Specification for U.S. Appl. No. 10/677,617, filed Oct. 2, 2003.

* cited by examiner

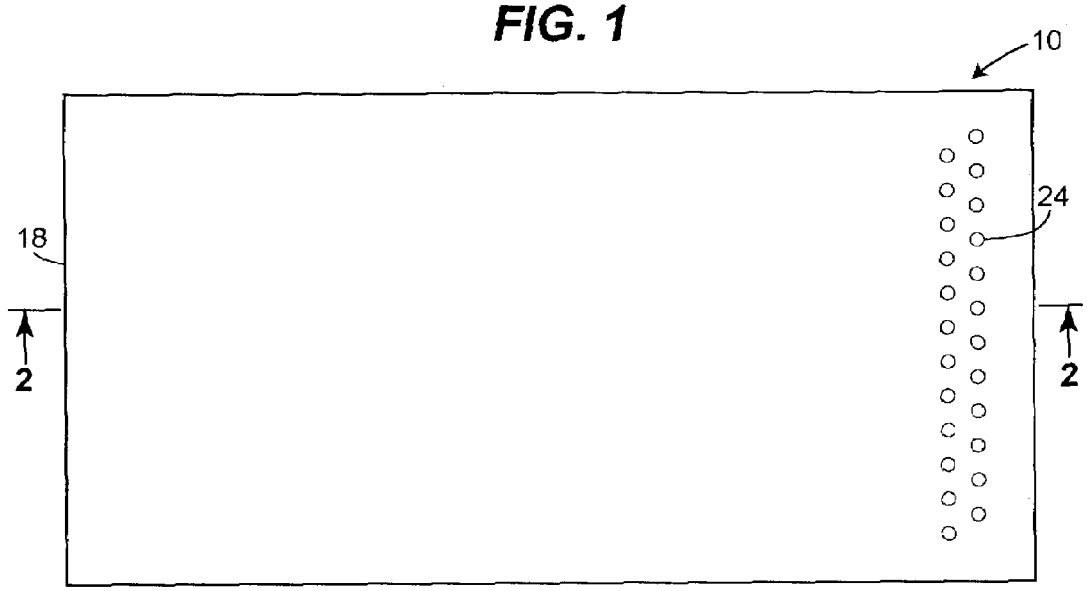
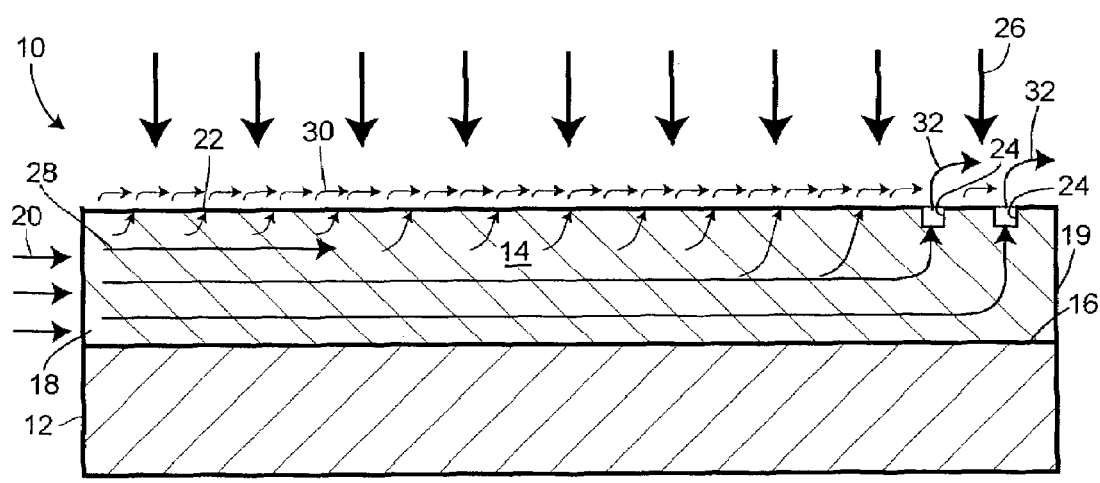

| AREA | SURFACE TEMPERATURE °F | |
|---|---|---|
| I |  | 700 TO 1000 |
| II |  | 1000 TO 1600 |
| III |  | 1600 TO 2000 |
| IV |  | > 2000 |
|  |  | NOT PART OF STUDY |

ACTIVELY COOLED CERAMIC THERMAL PROTECTION SYSTEM

BACKGROUND OF THE INVENTION

1. Field of the Invention

This invention is generally directed to methods and apparatuses for achieving thermal protection of low temperature materials in a high heat flux environment, and, more particularly, to active cooling methods and apparatuses traditionally involving backside convective cooling or transpiration cooling.

2. Description of the Related Art

Many engineering applications involve long-term exposure of structural materials to high heat flux thermal environments. The use of lightweight or low cost materials in such environment is often times only possible if some sort of thermal protection system (TPS) is incorporated into the design. The use of high temperature insulation or other passive approaches can result in unacceptably large mass/volume penalties, major supportability concerns, or severe operational restrictions. Long-term protection requires some sort of active cooling system, such as backside convective cooling or transpiration cooling.

A backside convective cooling TPS includes a thermally conductive material that transfers heat to a flowing coolant. Thermal management of the energy absorbed by the coolant significantly increases the complexity of this TPS. The coolant must reject the absorbed thermal energy at a heat sink or else be expelled and replaced.

A transpiration cooling TPS is the most thermally efficient active cooling approach, but its implementation has been severely limited due to difficulties imposed by the structural characteristics of porous materials. A typical transpiration TPS has a plenum bounded by an outer wall made from a porous material. The porous material has a large convective surface area per unit volume, providing highly effective cooling of the material and ultimately good thermal protection to the underlying structure. However, the choice of porous material for a transpiration TPS poses a difficult design problem. The two most attractive possibilities, porous ceramics and porous sintered metals, each have significant drawbacks. Porous ceramics tend to be brittle and have reduced structural strength compared to metals. Porous sintered metals tend to be stronger but are also heavier than porous ceramics, and thus may impose an unacceptable weight penalty.

Additionally, the need for a separate plenum for both backside convective and transpiration thermal protection systems adds greatly to the cost, weight and complexity of these systems. The need for a plenum in these systems may also be completely incompatible with applications requiring material continuity throughout the TPS.

SUMMARY OF THE INVENTION

In accordance with one aspect of the invention, a thermal protection system apparatus is provided that includes a porous layer attached to an inner structural member requiring thermal protection. The porous layer may include a low strength ceramic foam. The porous layer serves as both a cooling air plenum and a transpiring medium. Thermal protection may be achieved by flowing cooling air the length of the porous layer. The void sizes in the porous layer may be small enough to ensure the occurrence of micro-fluidic effects that produce highly efficient thermal protection as cooling air flows through the layer. A semi-permeable layer may be attached to the outer surface of the porous layer. The semi-permeable layer may prevent erosion of the porous layer and may also serve to ensure that the majority of the cooling air flows the length of the porous layer before exiting the TPS via small holes drilled or punched through the semi-permeable layer.

BRIEF DESCRIPTION OF THE DRAWINGS

Objects, features, and advantages of the present invention will be become apparent upon reading the following description in conjunction with the drawings figures, in which:

FIG. 1 is a plan view of a thermal protection apparatus according to the invention;

FIG. 2 is a cross-section view of the thermal protection apparatus of FIG. 1, taken along lines 2-2 of FIG. 1.

DETAILED DESCRIPTION

Figure 3:
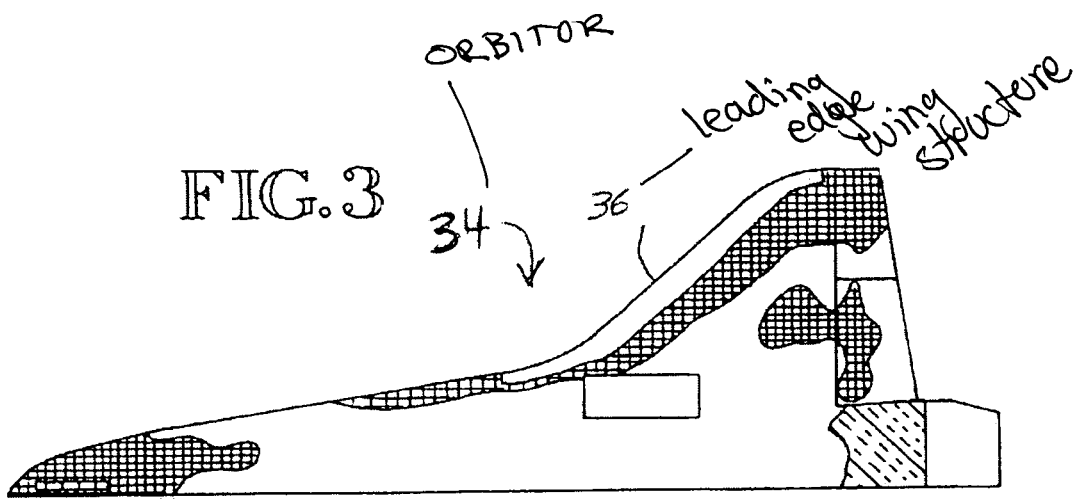
FIG. 3 is a lower surface view illustrating the surface temperature of the Space Shuttle following reentry, showing hot spots on the upper surface where cooled insulation surface temperature control systems and methods in accordance with the invention may be used.

With reference to FIGS. 1 and 2, a thermal protection apparatus, generally indicated at 10, includes an inner structural member 12, and a porous layer 14, that may be adhesively bonded or otherwise attached to the inner structural member 12 along a bond line 16. The inner structural member 12 may be formed from a metallic material, such as titanium. Pressurized air may be introduced into the porous layer 14 at an inlet end 18 of the porous layer 14 and may penetrate the porous layer 14 providing a flow of cooling air through the porous layer 14 as indicated by arrows 20.

The porous layer 14 may have a void size of less than 50 microns, and may be formed from a ceramic foam material. The low thermal conductivity of ceramic foam helps minimize the cooling requirement of the thermal protection system. The low structural strength of ceramic foam compared to conventionally employed porous materials is unimportant since the underlying substructure functions as the primary load bearing structure. An example of the type of ceramic foam referred to is the commercially available Rescor 360 rigid thermal insulation. This insulation is manufactured by the Cotronics Corporation, has a density of about 256.3 kg/m$^3$ (16 lb/ft$^3$), and may have a thickness of about 2.54 cm (1.0"). Because of the insulative qualities of the ceramic foam, it may be bonded to the inner structural member 12 using commercially available room temperature vulcanizing (RTV) silicone such as GE RTV-630, GE RTV-560, or Dow Corning DC3145. Bondline thickness for the adhesive may be as thin as 0.2 mm (0.008").

A semi-permeable layer 22 may be disposed on an exterior surface of the porous layer 14. The semi-permeable layer 22 protects the underlying low strength porous layer 14 from erosion by high velocity flow and may be composed of a densification layer covered with a ceramic matrix composite (CMC). An example of a densification product is the commercially available Rescor 901A liquid insulation hardener and rigidizer made by the Cotronics Corporation. Nextel 312 fabric combined with a sintered ceramic matrix is an example of a CMC. In an environment where radiation is the dominant mode of heat transfer, the semi-permeable layer 22 could instead be a highly reflective semi-permeable skin that, when bonded to the exterior surface of the porous layer 14, would both restrict transpiration and minimize absorbed energy.

The semi-permeable layer 22 may include a plurality of perforations 24, located in the general vicinity of an outlet end 19 of the porous layer. The perforations 24 may, for example, have a diameter of about 1 mm (40 mils), a depth of about 2.5 mm (0.10"), and may be spaced apart by about 3.05 mm (0.12"). The perforations 24 may be formed using a drilling operation, or a simple and inexpensive punching operation that penetrates the semi-permeable layer 22, without the need for an expensive drilling operation.

A heat source, indicated by arrows 26, is disposed above the cooling apparatus 10. Cooling air flows through the porous layer 14, as indicated by arrows 28, generally from the inlet end 18 to the outlet end 19. While some air may flow through the semi-permeable layer 22 before reaching the perforations 24, as indicated by arrows 30, the semi-permeable layer 22 provides a significant hindrance to the flow of air out of the porous layer 14. Therefore, the majority of the cooling air flows through the perforations 24, as indicated by curved arrows 32. The distance the air flows within the porous layer may be greater than two feet.

The invention overcomes the inherent deficiencies of conventional active cooling thermal protection systems by minimizing the structural loads on the porous material and eliminating the need for a separate cooling air plenum. Another innovative feature of the invention is that micro-fluidic effects typically found in microelectromechanical systems (MEMS) are utilized to more efficiently cool the bond line and substructure. The air flow passages in the ceramic foam may be less than 50 μm in diameter. Forcing cooling air through these micro-channels significantly reduces the density of the air. A reduction in density causes the cooling flow to accelerate continuously along the bond line. Thermal energy in the fluid that is picked up as a consequence of removing heat from the foam is converted to kinetic energy as the flow accelerates, thereby lowering the fluid temperature. This micro-fluidic effect ultimately results in more efficient cooling of the material than would be the case for macro scale incompressible flow.

This micro-fluidic effect has been demonstrated in laboratory experiments. A test was conducted in which a 2.54 cm (1") thick porous ceramic insulation sheet of a 45.7 cm×45.7 cm (18"×18") size with a hardened CMC semi-permeable layer attached to the exterior surface, was adhesively bonded with high temperature silicone to a titanium plate. The titanium plate was embedded in 20.3 cm (8") of insulation to eliminate any transfer of heat through the plate. A heat flux resulting in a surface temperature of 382° C. (720° F.) was imposed on the test sample. Cooling air initially at a temperature of 224° C. (435° F.) traveled 45.7 cm (18") through the insulation before exiting at a temperature of 209° C. (408° F.) The average bond line temperature was 213° C. (416° F.) The micro-fluidic effect within the porous ceramic insulation results in the coolant temperature falling 15° C. (27° F.) while the bond line is held to approximately the temperature of the coolant. A pressure of 64.8 kPad (9.4 psid) was required to drive a cooling air flowrate of 1.71 kg/min/m$^2$ (0.35 lbm/min/ft$^2$) through the test sample in this case. This level of driving pressure is readily achievable for many applications, particularly in view of the very low cooling air flow rate required.

FIG. 3 depicts a vehicle in which the invention may be used, a U.S. Space Transportation System Space Shuttle orbiter 34. The orbiter 34 is both an aircraft (i.e., during reentry and landing) and a spacecraft (i.e., during orbit). As will be readily apparent to those of ordinary skill in the art, the thermal protection apparatus 10 may be incorporated into leading edge wing structure 36 or any other structure that is subjected to a high heat flux environment.

Although the preferred embodiments of the invention have been disclosed for illustrative purposes, those skilled in the art will appreciate that various modifications, additions and substitutions are possible, without departing from the scope and spirit of the invention as disclosed herein and in the accompanying claims. For example, although air has been disclosed as a coolant, other fluids may of course be used.

What is claimed is:

1. A thermal protection apparatus comprising:

a porous layer, having a void size of less than about 50 microns, and having an outer surface and an inner surface, directly attached to an inner structural member requiring thermal protection at said inner surface of said porous layer, and having a semi-permeable layer attached to said outer surface of said porous layer, said porous layer adapted to carry a flow of cooling fluid that is actively introduced into said porous layer, said porous layer including an inlet end and an outlet end, said inlet end being adapted to receive said flow of cooling fluid into said porous layer, and said outlet end being adapted so that most of said cooling fluid exits out of said outlet end after flowing along a substantial length of said porous layer, wherein said length is substantially parallel to a bond-line between said porous layer and said inner structural member.

2. The thermal protection apparatus of claim 1, wherein said outlet end includes one or more openings in said semi-permeable layer, each of said openings being adapted to provide an exit path for most of said cooling fluid as it exits out of said outlet end after flowing along said substantial length of said porous layer.

3. The apparatus of claim 1, wherein said porous layer includes a ceramic foam layer.

4. The apparatus of claim 3, wherein said semi-permeable layer includes a hardened ceramic matrix composite.

5. An aircraft comprising:
an inner structural member requiring thermal protection; and
a porous layer, having a void size of less than about 50 microns, and having an outer surface and an inner surface, directly attached to said inner structural member at said inner surface of said porous layer, and having a semi-permeable layer attached to said outer surface of said porous layer, said porous layer adapted to carry a flow of cooling fluid that is actively introduced into said porous layer, said porous layer including an inlet end and an outlet end, said inlet end being adapted to receive said flow of cooling fluid into said porous layer, and said outlet end being adapted so that most of said cooling fluid exits out of said outlet end after flowing along a substantial length of said porous layer, wherein said length is substantially parallel to a bond-line between said porous layer and said inner structural member.

6. The aircraft of claim 5, wherein said outlet end includes one or more openings in said semi-permeable layer, each of said openings being adapted to provide an exit path for most of said cooling fluid as it exits out of said outlet end after flowing along said substantial length of said porous layer.

7. The aircraft of claim 5, wherein said porous layer includes a ceramic foam layer.

8. The aircraft of claim 7, wherein said semi-permeable layer includes a hardened ceramic matrix composite.

9. A space vehicle comprising:
an inner structural member requiring thermal protection; and
a porous layer, having a void size of less than about 50 microns, and having an outer surface and an inner surface, directly attached to said inner structural member at said inner surface of said porous layer, and having a semi-permeable layer attached to said outer surface of said porous layer, said porous layer adapted to carry a flow of cooling fluid that is actively introduced into said porous layer, said porous layer including an inlet end and an outlet end, said inlet end being adapted to receive said flow of cooling fluid into said porous layer, and said outlet end being adapted so that most of said cooling fluid exits out of said outlet end after flowing along a substantial length of said porous layer, wherein said length is substantially parallel to a bond-line between said porous layer and said inner structural member.

10. The space vehicle of claim 9, wherein said outlet end includes one or more openings in said semi-permeable layer, each of said openings being adapted to provide an exit path for most of said cooling fluid as it exits out of said outlet end after flowing along said substantial length of said porous layer.

11. The space vehicle of claim 9, wherein said porous layer includes a ceramic foam layer.

12. The space vehicle of claim 11, wherein said semi-permeable layer includes a hardened ceramic matrix composite.

* * * * *